2,780,557
Patented Feb. 5, 1957

United States Patent Office

2,780,557
ASPHALT EMULSIONS CONTAINING AMINE DERIVATIVES OF $P_2S_5$ OLEFIN PRODUCTS

Harley F. Hardman, Lyndhurst, and Robert F. Jenkins, Cleveland, Ohio, assignors to The Standard Oil Company, Cleveland, Ohio, a corporation of Ohio No Drawing. Application February 9, 1953,
Serial No. 335,978

2 Claims. (Cl. 106—277)

This invention relates to asphalt emulsions having improved adhesion, and more particularly to those asphalt emulsions in which the asphalt contains an adhesion-improving additive prepared by reacting a phosphorus sulfide with an olefin and then reacting with a higher aliphatic amine.

Ordinary asphalt from petroleum sources that is used for paving purposes, generally termed asphalt "cement," must be heated to a temperature generally about 300° in order to be free flowing for mixture with aggregate. In order to avoid the requirements for heating, it has been proposed to flux or dissolve the asphalt in a hydrocarbon solvent in order that the asphalt may be free flowing at room or ambient temperatures. The amount of the solvent determines the viscosity of the asphalt. These compositions are known as "cut-back" asphalts. This form of asphalt is more expensive because of the solvent requirements. The evaporation of the solvent after use also presents fire hazards and may be time consuming.

It has also been proposed to emulsify asphalt in water. Asphalt "emulsions" have been used more extensively abroad than in this country. The asphalt is more commonly emulsified as the inner phase of the emulsion which is of the so-called oil-in-water type. The particles of asphalt in the emulsion range from 1 to 20 microns in size and the asphalt emulsion is free flowing at ordinary temperatures. The water and emulsifying agent used in making emulsion is, of course, much cheaper than the hydrocarbon solvent required for making a cut-back asphalt. The viscosities of the asphalt emulsions and the cut-back asphalts are comparable.

In making asphalt emulsions, the asphalt is heated to a liquid state, and the water containing the dispersing agent, generally soap, is emulsified with the asphalt, such as in a colloid mill. The emulsion varies in color from brown to black, the lighter colors generally indicating a greater subdivision of the asphalt particles.

When the asphalt emulsion is applied to aggregate or soil, the water either evaporates or is absorbed and the emulsion breaks and the asphalt is intended to adhere to the aggregate or soil.

Asphalt emulsions must meet five important criteria, i. e., stability, demulsibility, asphalt content, viscosity, and adhesion.

The stability of the emulsion is important since it is usually prepared ahead of time and shipped in drums, tank or railroad cars and must remain unbroken in the emulsion form until used. If the emulsion breaks in the container, not only would the product be useless, but it would be difficult to remove the asphalt from the container. Practically speaking, the emulsion must remain stable during any storage time at the refinery, during shipping, and during any storage time after receipt until used. This period may vary widely from a week to many months. Federal Specifications SS–A–674a require no separation of asphalt at the time of use provided the material is not held more than thirty days after delivery. Since there is no other accepted specification on stability, a stability of not less than thirty days is set forth as the desideratum in the following table of requirements.

The demulsibility test indicates the rate at which the emulsion breaks into its components after it is applied. Asphalt emulsions are generally made in three types: The RS or rapid setting type, the MS or medium setting type, and the SS or slow setting type. The first two are the most common. The demulsibility test is described as A. S. T. M. Test No. D–244–42 and is carried out by adding calcium chloride solution to the emulsion and measuring the amount of asphalt that is recovered from the emulsion within certain times. Ohio Specification M–5.5 requires at least 60% of the asphalt to be demulsified within the time specified in the A. S. T. M. test in the RS type, and not more than 30% in the MS type. Thus the emulsion must be one which is unstable under the conditions of use but must be stable until use.

The asphalt content is generally specified as 50% or more. Ohio Specification M–5.5 requires an asphalt content of at least 55% for the rapid setting type and at least 60% for the medium setting type. This requirement is important since it is the asphalt content of the emulsion that is of value and asphalts of high water content are less desirable because the water is of no value.

The viscosity is related somewhat to asphalt content, but viscosity requirements generally are such as to permit mixing of the emulsion with the aggregate. If the water content of the emulsion is plotted against viscosity, there is a sharp decrease in viscosity of the emulsion when the water content reaches 40 to 50%, and as the amount of water increases beyond this, the viscosity of the emulsion rapidly approaches the viscosity of water. Asphalt contents above about 50 to 60% have higher viscosities. Thus an emulsion with maximum asphalt content, which has a low enough viscosity for mixing, is ideal. The viscosity is measured in Furol seconds at a stated temperature. The viscosity measurement test is described as A. S. T. M. D–244–42. Ohio Specification M–5.5 specifies a viscosity of 20 to 100 for the RS–1 type at 25° C., 75 to 400 for the RS–2 type at 50° C., and 100 to 1,000 for the MS type at 50° C.

The last requirement, namely adhesion, is particularly important and is more significant in the case of emulsions than in the case of asphalt cements. Since asphalt cements are generally applied hot to dry aggregate, it is not as difficult to secure adhesion when the asphalt is mixed with aggregate. In the case of asphalt emulsions, however, the water is in the outer phase and tends to wet the aggregate before the asphalt touches it. In fact, one of the advantages attributed to asphalt emulsion is the ability to use a wet aggregate during construction, thereby eliminating the expense of drying and preheating the aggregate.

Asphalt emulsions are notoriously poor in adhesion properties, and there is no standardized A. S. T. M. or Federal testing procedure for this property of emulsions. Various adhesion tests have been proposed and one test which has been devised, and which is the one used by the applicants, is Ohio Specification M–205.5. The testing procedure is as follows:

100 grams of dry standard silica aggregate graded to pass a ¼ inch sieve and to be retained on a No. 10 sieve shall be heated to 300° F. in a metal container on a hotplate, then 8 grams of the emulsion added (the emulsion need not be heated) and mixed until the aggregate is completely coated. Approximately 50 grams of the mixture shall be spread thinly on a metal can lid or a watch glass and placed in a constant temperature oven at 200° F. for 24 hours. At the end of this curing period, the 50-gram sample shall be thoroughly remixed if any drainage has occurred and dropped into 400 cc. of boiling distilled water in a 600 cc. beaker and stirred for 3 minutes at the rate of approximately 60 times per minute, continuing the boiling of the water during the 3-minute period. The beaker shall then be removed from the source of heat and after ebullition ceases, cold water shall be run into the beaker through a ¼ inch tubing submerged about one inch below the surface of the water. The addition of the cold water shall be continued until the film of asphalt on the surface of the water in the beaker has flown over the side. After this is accomplished, the sample shall be removed from the beaker, care being taken to prevent re-coating of the aggregate with asphalt deposited on the beaker, and placed on absorbent paper. After drying, the sample shall be examined for uncoated areas and an estimate made of the percent of aggregate area remaining coated with asphalt.

Most commercial asphalt emulsions have a rating of 0 to 15% when tested by the above procedure. An additive that raises the adhesion of the asphalt emulsion to 50% under this test is considered to impart a marked improvement, and an adhesion of 75% is excellent.

A résumé of the requirements is as follows:

TABLE I

| Requirement | RS-1 | RS-2 | MS |
|---|---|---|---|
| Furol viscosity in seconds: | | | |
| at 25° C | 20–100 | | |
| at 50° C | | 75–400 | 100–1,000 |
| Asphalt Content or residue, percent | 55+ | 60+ | 60+ |
| Stability | <30 days | <30 days | <30 days |
| Demulsibility: | | | |
| (35 cc. N/50 CaCl₂), percent | 60+ | 60+ | |
| (50 cc. N/10 CaCl₂), percent | | | 30– |
| Adhesion Test, percent of aggregate coated | 50 to 75 | 50 to 75 | 50 to 75 |

Asphalt emulsions are fully described in the art. The invention is applicable to all asphalt emulsions, especially those of the oil-in-water type in which the dispersing agent is or comprises a soap. The manner of making the emulsions is well known in the art together with the ingredients, proportions, mixing techniques and conditions, and further description is not necessary.

It is not difficult to meet the specifications on asphalt content, viscosity, stability and demulsibility. It is difficult, however, to meet these requirements and at the same time to achieve good adhesion. The invention is concerned with improving the adhesion of the asphalt to aggregate and at the same time meeting the other specifications. The difficulty of achieving good adhesion will be readily understood when it is considered that the stability and demulsibility largely involve surface active considerations. The same is true of the adhesion of the asphalt, i. e., the ability of the asphalt to adhere to the aggregate is largely a surface active phenomenon. Many compounds are available to improve the adhesion of asphalt cement which cannot be used in asphalt emulsions because these compounds are generally so polar or possess such surface active properties as to interfere with the viscosity, stability or demulsibility of the emulsion. The selection of an additive which will increase the adhesion and not affect the stability or demulsibility, i. e., will still permit the emulsion to meet specifications on these scores, is a genuine problem in the art not easily solved.

In an asphalt emulsion made with a sodium soap as the emulsifier, it is believed that a fatty end of the soap molecule attaches itself to the asphalt in the emulsion and the sodium end of the soap molecule projects and is in the aqueous phase. It will be apparent that any ingredient of either the asphalt or the aqueous phases may readily affect this balance to such an extent as to affect the character of the emulsion.

Additives useful in cement and cut-back do not serve as guides in solving the problem of improving the adhesion of emulsions because most adhesive additives for asphalt cement are unsuitable in emulsions and there is no correlation or predictability from the asphalt cement art as to what additives are suitable in emulsions.

Many additives have been proposed heretofore for asphalt emulsions for variety of properties. In general, however, these additives are contained in the aqueous phase and our invention is to be distinguished from these since our additive is added to the asphalt phase.

We have discovered, in accordance with our invention, that asphalt emulsions are improved in adherence by an additive made by reacting phosphorus pentasulfide with an olefin, optionally treating the reaction product by steam, and then reacting with a higher aliphatic hydrocarbon amine. This additive also permits other asphalt specification requirements to be met, particularly stability and demulsibility.

In general, olefins used in preparing the additive have from about 4 to about 25 carbon atoms in the molecule and these are preferred as an initial reaction component. A commercially desirable olefin is so-called "motor polymer" or species of this known as "heavy motor polymer" or "reduced motor polymer." Motor polymer, as this term is used, is an olefin polymer made from $C_3$ and $C_4$ olefins by polymerization, e. g., with a phosphoric acid type catalyst. It is slightly fluorescent, light colored liquid. In its whole state it has an F–2 clear octane rating in the range of 75–85, and a typical motor gasoline boiling point range with the bulk of the products boiling off at between about 190° and 360° F., thus indicating that the bulk of the material is in the $C_8$-$C_{10}$ olefin boiling range with some lighter and heavier ends. The polymers appear, in general, to be fairly highly branched and contain substantial proportions of tertiary olefins. Little or no diolefins are present and it contains virtually no aromatic, naphthenic or paraffinic constituents. This is well known in the industry as "motor polymer" and need not be further defined to be fully understood by one skilled in the art.

A polymer gasoline fraction may be removed by fractional distillation to the 250° F. cut point, and the residue (I. B. P. of 250°) is known as "reduced motor polymer." The reduced motor polymer may contain small amounts of materials lighter than trimer, its average molecular weight is about 145, and it preferably contains a major amount of olefins boiling below 600° F. Other fractions having other initial boiling points (I. B. P.) are referred to as heavy motor polymer and are identified by their I. B. P. Olefins and olefin polymers made from other olefins and by other methods may be used.

The sulfide-olefin reaction may be carried out in the presence or absence of air, or in an atmosphere of inert, or non-deleterious gas, such as nitrogen or $H_2S$. It may also be carried out at atmospheric pressure or under superatmospheric pressure, e. g., the pressure generated when the reaction is carried out in a closed vessel or the pressure due to an added inert gas.

Water within the range of 0 to 10% may be present, preferably about 3 to 6%, if water is employed. The yield is very high. Generally, the amount of phosphorus pentasulfide is chosen so that all of it will react at the temperature selected and the reaction is continued until it is consumed. In general, about 0.25 to 0.75 mol of phosphorus pentasulfide are used per mol of olefin. The preferred ratio is about 0.5:1.0. The temperature for the reaction is selected so that it proceeds at such a rate as to complete the reaction in a reasonable time. Generally, the temperature is within the range of 150° to 425° F., the lower temperatures requiring much longer reaction times. The preferred temperature range is 280° to 350° F.

The phosphorus pentasulfide-olefin reaction product may be made with direct admixture of the reactants, or, if desired, by their admixture in the presence of a diluent which may or may not be subsequently removed.

The reaction is usually complete in about 10 hours or less time, except in the case of temperatures in the lower part of the range. The reaction time is a function of the temperature, the pressure, the amount of the phosphorus pentasulfide that is to react the subdivision of the reactants, the rate of stirring, etc.

If the reaction product is reacted with steam before reaction with the amine, this is preferably carried out at a temperature within the range of 212° to 300° F., preferably 215° to 260° F., and is continued until the desired product is obtained, generally from ½ to 48 hours, depending somewhat on the rate of the reaction with steam. This reaction is believed to be one of hydrolysis in which oxygen replaces sulfur with the elimination of sulfur as $H_2S$. It is carried out conveniently by passing steam through the reaction product at an elevated temperature.

The sulfide-olefin reaction product may be used as such in the next step. However, if there is any sludge, it may be centrifuged or filtered to remove any traces of insoluble by-product substances.

The amine derivative of the reaction product is prepared by mixing the two ingredients, for any reasonable time to complete the reaction, at room temperature, or above, preferably at a temperature of about 200° F. in order to shorten the reaction.

The amine should be a higher aliphatic hydrocarbon amine, i. e., one having 8 to 24 carbon atoms. Amines having aliphatic hydrocarbon chains of 10 to 12 atoms, e. g., decylamine and dodecylamine, and commercial and technical amines composed largely of these amines, give excellent results. A commercially desirable amine is that made from the coconut oil fatty acid mixture, and is sometimes called "cocoamine." It is a mixture of amines having alkyl radicals in proportion to their natural occurrence in coconut oil, predominantly 12 and 14 carbon atoms. It is sold under the trade name "Armeen-C." With the less costly technical grade of cocoamine, a slightly higher concentration of the additive may be required, than in the case of the pure amines.

The cocoamine itself is not suitable as an additive for improving the coating properties of the asphalt emulsion when incorporated in an amount equivalent to the amine content of the amine in the olefin-sulfide reaction product.

The amount of the amine reacted may be from 0.1 to 1.5 equivalents of the theoretical amount required based on the neutralization number of the reaction product, (with or without the reaction with steam), 0.6 to 1.2 mols being optimum. Preferably the amount of the amine is about one equivalent or an amount which will give a substantially neutral reaction product, i. e., one which when incorporated in the asphalt emulsion will not substantially alter the pH value of the aqueous phase.

The following is illustrative of the preparation of the initial reaction product and the reaction with steam.

Example A

In a typical reaction of the olefin and the sulfide, 60 pounds of "reduced motor polymer," 38% of phosphorus pentasulfide and 2.4 pounds of water were mixed and heated in a closed vessel. The temperature reached 350° F. in one hour and it was maintained at this temperature for 3 hours, with agitation. The reaction mass was then filtered hot from a sludge amounting to about 10%. The resulting product had the following properties:

3.9 weight percent pentane insolubles, a viscosity at 100° F. of 167 cs. (centistokes), 25.2% sulfur, 8.4% phosphorus, a molecular weight of 333, a neutralization number of 45, a saponification number of 212, and a density of 1.0505, and an optical density of 321.

Example B

A portion of the above $P_2S_5$ "motor polymer" reaction product from Example A was reacted with steam at a temperature of 230° F., for two hours. The residue was 70.6 weight percent of the charge. This residue had the following characteristics:

32.2 weight percent pentane insolubles, a viscosity at 100° F. of 5.370 cs. or 24,800 SUS, 21.0 weight percent sulfur, 11.9 weight percent phosphorus, a neutralization number of 147, and a density of 1.1112.

Example C

The above initial reaction products were reacted with various amines in different amounts as indicated in the following table. The amines were added and the mixture heated and thoroughly stirred at 200° F. for 30 minutes.

TABLE II

| Example No. | Initial Reaction Product of Example— | Amine | Amount of Amine in Equivalents |
|---|---|---|---|
| 1 | A | octylamine | 1.0 |
| 2 | A | decylamine | 1.0 |
| 3 | A | dodecylamine | 1.0 |
| 4 | A | do | 0.5 |
| 5 | A | octadecylamine | 1.0 |
| 6 | A | Armeen-S | 1.0 |
| 7 | A | cocoamine | 1.0 |
| 8 | B | octylamine | 0.2 |
| 9 | B | decylamine | 0.2 |
| 10 | B | dodecylamine | 0.2 |
| 11 | B | cocoamine | 0.8 |
| 12 | B | do | 1.2 |
| 13 | B | do | 1.0 |

The amount of the additive made as described above which is incorporated in the asphalt emulsion is expressed herein in terms of percentage based on the asphalt content of the emulsion. The minimum amount which will give the requisite adhesion in general amounts of from ½ to 1½%. The minimum amounts will give adhesion of 50 to 75%. Smaller amounts will give improved but less adhesion but there will probably be a few instances where such poorer adhesion will be called for. Because of the economics involved, more of the additive will not be used than is required for the desired adhesion. Generally, amounts will not be in excess of 2% and in any instance, not in excess of 5%. Larger amounts do not affect the asphalt emulsion and we, therefore, do not believe there is any critical upper limit.

The following represent examples of the best mode of practicing the invention with reference to rapid- and medium-setting types of asphalt emulsion, which are in the most common use. However, it is not to be inferred that our invention is limited to the best mode of practicing it or otherwise restricted to a lesser scope than that defined hereinbefore.

Inasmuch as the additive is mixed with the asphalt before the emulsion is made, it is not possible to make exact duplicate samples except within the margin of reproducibility of making emulsions. This is to be distinguished from situations in which an emulsion can be made and an additive added to the emulsion after it is made. Any differences in the comparative data in following tables are not significant in so far as the important criteria are concerned.

Example 14

(a) A rapid-setting asphalt emulsion was prepared by emulsifying asphalt with water, the emulsifying agent being the conventional soap used in this art in an amount of about 1.3 to 1.4% based on the aqueous phase and containing free sodium hydroxide in an amount of about 0.2% based on the aqueous phase. The properties of this asphalt are shown in column 1 of Table III hereinafter.

(b) An otherwise substantially identical asphalt emulsion was prepared, except that the asphalt was thoroughly mixed with the reaction product of Example 13 described heretofore, before the asphalt was emulsified. The properties of this emulsion are shown in Table III.

TABLE III

|  | Example 14(a) | Example 14(b) |
|---|---|---|
| Emulsion type | RS-2 | RS-2 |
| Amount of additive_____percent__ | 0 | 1.0 |
| Percent asphalt | 61.5 | 61.5 |
| Viscosity (Furol seconds at 50° C.) | 210 | 310 |
| Demulsibility: | | |
| Fresh_____percent__ | 67 | |
| 1 day_____do__ | | 62 |
| Stability_____days__ | <30 | <30 |
| Adhesion_____percent__ | 0 | 80 |

*Example 15*

(a) An asphalt emulsion of the medium-setting type was prepared, similar to that described in the previous example, which contained about 3.2% soap on the aqueous phase and about 0.2% free alkali on the aqueous phase. The properties of this are shown in the following table.

(b) A similar medium-setting asphalt emulsion was prepared which is substantially identical with that described in the previous paragraph, except that it contained 1% of the additive described heretofore under Example No. 13. The properties of this asphalt are shown in the following table.

TABLE IV

|  | Example 15(a) | Example 15(b) |
|---|---|---|
| Emulsion type | MS | MS |
| Amount of additive_____percent__ | 0 | 1.0 |
| Percent asphalt | 64.2 | 62.0 |
| Viscosity (Furol seconds at 50° C.) | 310 | 125 |
| Demulsibility: | | |
| Fresh_____percent__ | 0.5 | |
| 1 day_____do__ | | 0.5 |
| Stability_____days__ | <30 | <30 |
| Adhesion_____percent__ | 0 | 60 |

From these examples, it is readily apparent that the additive of the invention markedly improves the adherence of the asphalt without detracting in any way from the other properties while at the same time permitting the emulsion to meet all of the other important requirements set by current specifications.

We claim:

1. An asphalt emulsion having satisfactory asphalt content, viscosity, stability and demulsibility, comprising, as separate phases, asphalt which does not adhere satisfactorily to aggregate, and water, the two phases being dispersed and the dispersion stabilized with the aid of a water-soluble alkali metal soap, and, as an additive dispersed in the asphalt phase of the emulsion, an amount within the range from 0.5% to 2% based on the asphalt content of the emulsion, to improve the adhesion characteristic of the asphalt, of the product of reacting a liquid olefin and phosphorus pentasulfide in the proportion of about 0.25 to 0.75 mole of phosphorus pentasulfide per mole of olefin at a temperature within the range of 150° to 425° F., and then reacting the obtained reaction product with a higher aliphatic hydrocarbon amine having from 8 to 24 carbon atoms in the proportion of about 0.1 to about 0.15 equivalent per saponification equivalent of the reaction product.

2. The composition of claim 1 in which the aliphatic hydrocarbon amine has from ten to twelve carbon atoms.

References Cited in the file of this patent

UNITED STATES PATENTS

| 2,508,924 | Mertens et al. | May 23, 1950 |
| 2,690,976 | Bartleson et al. | Oct. 5, 1951 |
| 2,677,620 | Lemmon et al. | May 4, 1954 |